United States Patent
Perras et al.

(10) Patent No.: US 6,904,033 B1
(45) Date of Patent: Jun. 7, 2005

(54) METHOD, SYSTEM AND PACKET DATA SERVING NODE (PDSN) FOR MOBILE IP (MIP) REGISTRATION OF A MOBILE NODE (MN)

(75) Inventors: Michelle Perras, Montreal (CA); Louis Segura, St-Laurent (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 822 days.

(21) Appl. No.: 09/715,161

(22) Filed: Nov. 20, 2000

(51) Int. Cl.$^7$ ................................................ H04Q 7/24
(52) U.S. Cl. .................. 370/338; 370/352; 370/395.52; 455/435.1
(58) Field of Search ................................. 370/338, 229, 370/230, 231, 335, 342, 352, 353, 395.52, 441, 465, 469; 455/435.1, 432.1, 433

(56) References Cited

U.S. PATENT DOCUMENTS

| | | | | |
|---|---|---|---|---|
| 6,112,087 A | * | 8/2000 | Tayloe ..................... | 455/435.2 |
| 6,418,315 B1 | * | 7/2002 | Seo et al. ................. | 455/435.1 |
| 6,563,809 B1 | * | 5/2003 | Proctor et al. ............. | 370/335 |
| 6,665,718 B1 | * | 12/2003 | Chuah et al. .............. | 709/225 |

OTHER PUBLICATIONS

Publication TR45—Wireless IP Network Standard/TIA/EIA/IS–835, 59 pages, Jun. 2000.

\* cited by examiner

Primary Examiner—Brian Nguyen
(74) Attorney, Agent, or Firm—Jenkens & Gilchrist, P.C.

(57) ABSTRACT

In an IP-based cellular telecommunications network, such as for example in a Code Division Multiple Access (CDMA) 2000 cellular telecommunications network, a method, a system and a Packet Data Serving Node (PDSN) for registering a Mobile Node (MN) with the PDSN. Once a Point-to-Point Protocol (PPP) connection is established between the MN and the PDSN, a PPP timer is started, the PPP timer being set to expire after a predetermined period of time. A Mobile Internet Protocol (MIP) registration takes place between the MN and the PDSN. The PDSN detects if the MIP registration is successful and if so, resets the PPP timer to a substantially higher value and the PPP session continues until one of the involved parties terminates it. If the MIP registration is not successful, the PDSN further detects if a new MIP registration request is received before the expiration of the predefined period of time, and if so, the PDSN resets the PPP timer again to the predefined period of time. Otherwise, if a new MIP registration request is not received before the timer expiration, the PDSN terminates the PPP connection. The PDSN comprises the PPP timer, an RP stack for supporting an RP connection, a PPP stack activated for the duration of the PPP connection, and a foreign agent for performing the MIP registration of the MN, which may be implemented using software or hardware modules, or a combination thereof.

24 Claims, 3 Drawing Sheets

METHOD, SYSTEM AND PACKET DATA SERVING NODE (PDSN) FOR MOBILE IP (MIP) REGISTRATION OF A MOBILE NODE (MN)

BACKGROUND OF THE INVENTION

1. Field of the Invention

The present invention relates to cellular telecommunications, particularly to a method, system, and corresponding Packet Data Serving Node (PDSN) for performing Mobile IP (MIP) registrations.

2. Description of the Related Art

The Code Division Multiple Access 2000 (CDMA2000) cellular telecommunications network is one of the third generation (3G) for the IP-based (Internet Protocol—based) cellular telecommunications networks, that can provide high-speed wireless connections allowing for multimedia sessions over wireless interfaces. In such an IP-based cellular telecommunications network, including in the CDMA 2000 cellular telecommunications network, for a Mobile Node (MN) to be able to carry out a wireless communications, a Packet Control Function (PCF) of a Base Station (BS) serving the MN must first establish a Radio network Packet data serving node (RP) session with a Packet Data Serving Node (PDSN). The establishment of the RP session is followed by the starting of a point-to-point protocol (PPP) connection, or session, between the MN and the PDSN, which is in turn followed by the MN's Mobile IP (Mobile Internet Protocol or MIP) registration with the PDSN. An MIP registration request is thus passed from the MN to the PDSN over the PPP connection and via the PCF, which forwards it to the PDSN over the RP session. The purpose of the Mobile IP registration signaling is to allow the MN to obtain an IP address for identifying the MN during the communications over the PPP connection.

In some instances, the MIP registration of the MN with the network may be unsuccessful, due to various reasons, such as for example invalid challenge value or time based desynchronization between the MN and the PDSN, etc. The cellular telecommunications standard IS-835 for CDMA 2000 defines that the RP and PPP sessions must most often be terminated in cases wherein an MIP registration is unsuccessful or rejected. However, for some conditions wherein the MN can correct the error that led to the unsuccessful MIP registration, the sessions may be kept.

Given the unpredictable behavior of MNs in various operational situations, the scenarios defined by the standard and specifying when the PPP sessions should be terminated are not consistent, as are the scenarios wherein according to the standard the sessions can be kept alive. For example, it was observed that in many situations the RP and PPP sessions are kept alive for long periods of time (default value is typically set to at least 9000 seconds in many implementations) in instances wherein, for various reasons, the MN does not correct the encountered internal error(s) and therefore does not attempt an additional MIP registration as expected. In other instances it was observed that the sessions were terminated while the MN was retrying an additional MIP registration leading to the reestablishment of the RP and PPP sessions immediately after their termination.

Therefore, due substantially to the unpredictable behavior the MNs may have in operational situations that were not tested and thus discovered, and for which no adequate solutions were implemented beforehand, many cases arise wherein the handling (keeping alive or killing) of the RP and PPP connections is inadequate.

It would be advantageous to have a consistent method allowing for repetitive MIP registration attempts in case of initial MIP registration failure for all the possible scenarios and situations that will occur in operational situations.

In particular, there is an advantage to have a method, a system, and a PDSN that could maintain the RP and PPP connections alive for a predetermined amount of time following an MIP registration failure for allowing subsequent MIP registration attempts to be performed.

SUMMARY OF THE INVENTION

In one aspect, the present invention is a method for Mobile IP (MIP) registration between a Mobile Node (MN) and a Packet Data Serving Node (PDSN), wherein the method first establishes a Point-to-Point Protocol (PPP) connection between the MN and the PDSN, and responsive to the establishment of the PPP connection, starts a PPP timer set to expire after a predetermined period of time. Thereafter, the MN attempts to perform an MIP registration with the PDSN and upon unsuccessful MIP registration of the MN with the PDSN, the method keeps alive the PPP connection between the MN and the PDSN until the expiration of the predetermined period of time of the PPP timer for allowing the MN to attempt at least one additional MIP registration during the predetermined period of time following the unsuccessful MIP registration.

In another aspect, the present invention is an IP-based cellular telecommunications system comprising a Mobile Node (MN), a Packet Data Serving Node (PDSN) connected to the MN through a Point-to-Point Protocol (PPP) connection, wherein responsive to the establishment of the PPP connection, the PDSN starts a PPP timer set to expire after a predetermined period of time, and wherein upon detecting an unsuccessful MIP registration attempt of the MN with the PDSN, the PDSN keeps alive the PPP connection between the MN and the PDSN until an expiration of the predetermined period of time of the PPP timer.

In yet another aspect, the invention is a Packet Data Serving Node (PDSN) comprising a Point-to-Point Protocol connection (PPP) timer started upon establishment of a PPP connection between the PDSN and a Mobile Node (MN), the PPP timer being set to expire after a predetermined period of time, a PPP stack enabled upon the establishment of the PPP connection, and a PDSN/Foreign agent functionality for performing a Mobile IP (MIP) registration of the MN with the PDSN, wherein upon detecting an unsuccessful MIP registration attempt of the MN with the PDSN, the PDSN/Foreign agent keeps the PPP stack enabled and the PPP connection alive between the MN and the PDSN until an expiration of the predetermined period of time of the PPP timer.

In yet another aspect, the invention is a method for Mobile IP (MIP) registration between a Mobile Node (MN) and a Packet Data Serving Node (PDSN), the method comprising the steps of establishing a Point-to-Point Protocol (PPP) connection between the MN and the PDSN, and responsive to the establishment of the PPP connection, starting a PPP timer set to expire after a predetermined period of time. The method further involves having the MN to attempt an MIP registration with the PDSN, and upon detecting an unsuccessful MIP registration of the MN with the PDSN: i) sending from the PDSN to the MN an MIP registration reply for informing the MN that the MIP registration was unsuccessful; and ii) keeping alive the PPP connection between the MN and the PDSN until an expiration of the predetermined period of time of the PPP timer. The method further includes, responsive to the receipt of the MIP registration reply at the MN, attempting an additional MIP registration of the MN with the PDSN by sending an additional MIP registration request from the MN to the PDSN, wherein the steps of attempting an MIP registration and the step of attempting an additional MIP registration comprise sending from the MN to the PDSN an MIP registration request.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
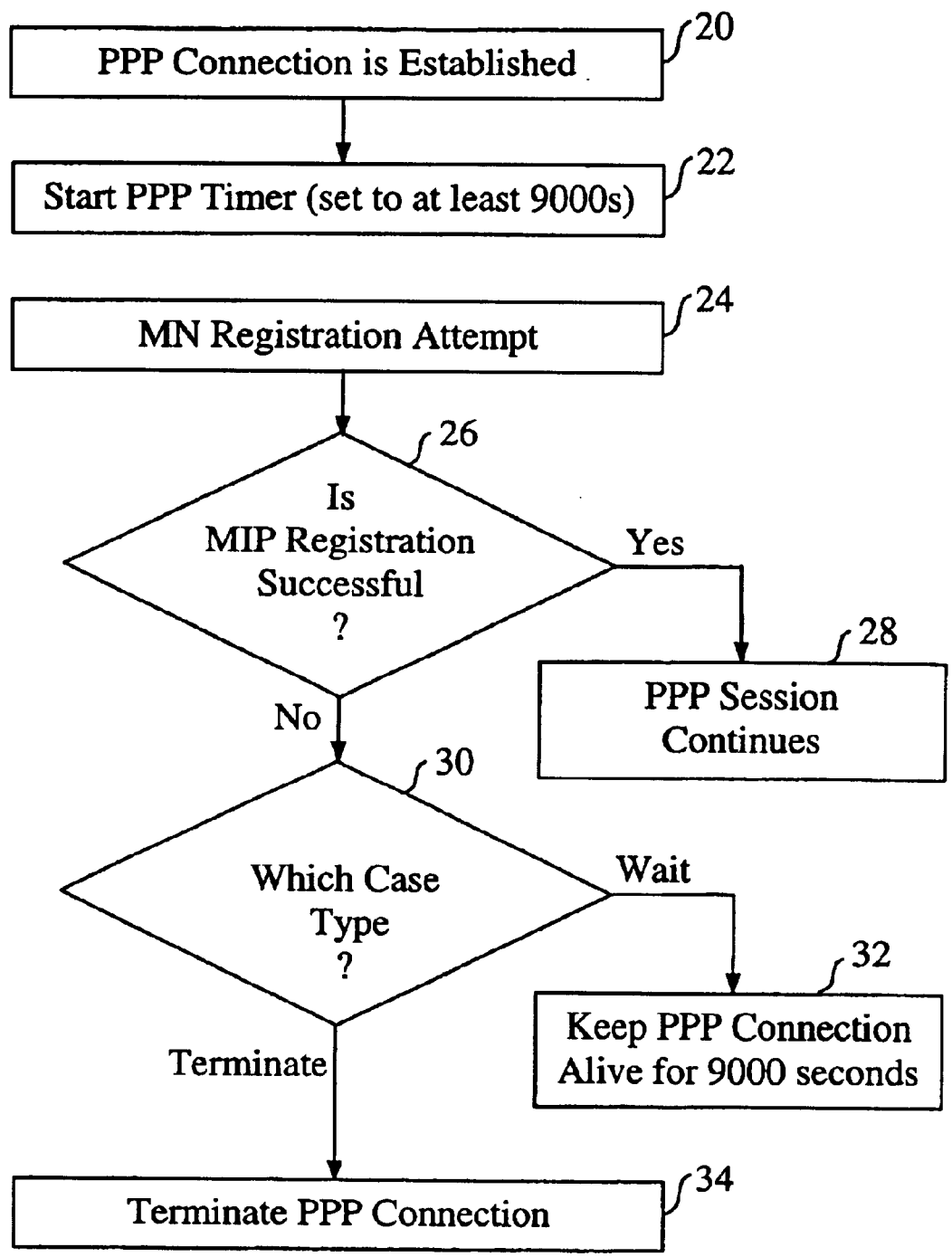
FIG. 1 (Prior Art) is a high-level flowchart representative of a method for Mobile IP (MIP) registration according to the prior art.

Reference is now made to FIG. 1 (Prior Art) wherein there is shown a high-level flowchart diagram representative of a method for Mobile IP (MIP) registration according to the prior art as defined in the standard IS-835 for CDMA 2000 cellular telecommunications networks.

First, in step 20, a Point-to-Point Protocol (PPP) connection is established. Upon establishment of the PPP connection, a PPP timer is started, step 22, wherein in many actual product implementations the PPP timer is set to expire at a default value of at least 9000 seconds. At step 24, the Mobile Node (MN) performs an MIP registration attempt by sending an MIP registration request message to the Packet Data Serving Node (PDSN) of the CDMA 2000 cellular telecommunications network. Responsive to the registration request, the PDSN tries to register the MN and to activate the IP services requested by the MN. Based on the success of these actions, the PDSN determines if the MIP registration is successful, or not, in step 26. If it is determined that the MIP registration is successful, then the PPP session continues, step 28, until one side decides to terminate the connection established in step 20. If not, i.e. if the MIP registration is determined to be unsuccessful, the PDSN further detects in step 30 which case of unsuccessful MIP registration it is dealing with, in order to assess if according to the scenarios defined in the standard, it should either maintain the session alive until the expiration of the timer started in step 22, step 32, or terminate the PPP connection, step 34. For performing step 30, the PDSN may consider the type of error, or error code, that is encountered when attempting to establish the MIP registration, and based on this error code, decide whether or not to keep the PPP connection alive, step 32, or to terminate it, step 34.

However, it was noted that in the above described prior art implementation, instances occur wherein, for example, the PPP connection is kept alive for the period of 9000 seconds, like in step 32, as decided in step 30 the basis of the standard requirements. However, in such a situation, oftentimes the MN acts unpredictably, due to for example internal glitches, and therefore the expected additional MIP registration retry cannot take place during the time interval of at least 9000 seconds. In such instances, according to the current known implementations, the RP and PPP connections are kept alive for almost two hours and a half with no success for the MIP registration, thus unnecessarily using network resources. Another instance wherein the prior art implementations as described hereinbefore are not suitable for the actual operational situations, is when the MN attempts to perform the MIP registration using an expired foreign agent challenge parameter received from the PDSN. If the MN does not include the latest foreign agent challenge parameter advertised by the PDSN in the registration request message it sends to the network, according to the standard implementations, the PDSN rejects the MIP registration request, as shown in step 26, detects in step 30 that the PPP connections should be terminated, and actually drops the PPP connection in step 34. This latest instance is also inadequate, since the MN could have further listened for a subsequent foreign agent challenge parameter advertised by the PDSN on the air (radio) interface or received in an MIP registration reply message, and re-attempt an MIP registration, which could be this time successful. However, the PPP connection was dropped in step 34, and thus the MN needs to fully re-establish new RP and PPP connections, and only afterwards re-attempt an MIP registration. This implementation requests excessive and unnecessary bandwidth and computing recourses from the network.

The present invention proposes to solve the deficiencies of the above-described prior art implementations in a convenient yet simple fashion, by allowing MNs to re-attempt registrations with the PDSN of an IP-based cellular telecommunications network (such as for example a CDMA 2000 cellular telecommunications network) in all possible cases, during a substantially short predefined period of time following an unsuccessful MIP registration (e.g. of the order of magnitude of a few minutes).

Figure 2:
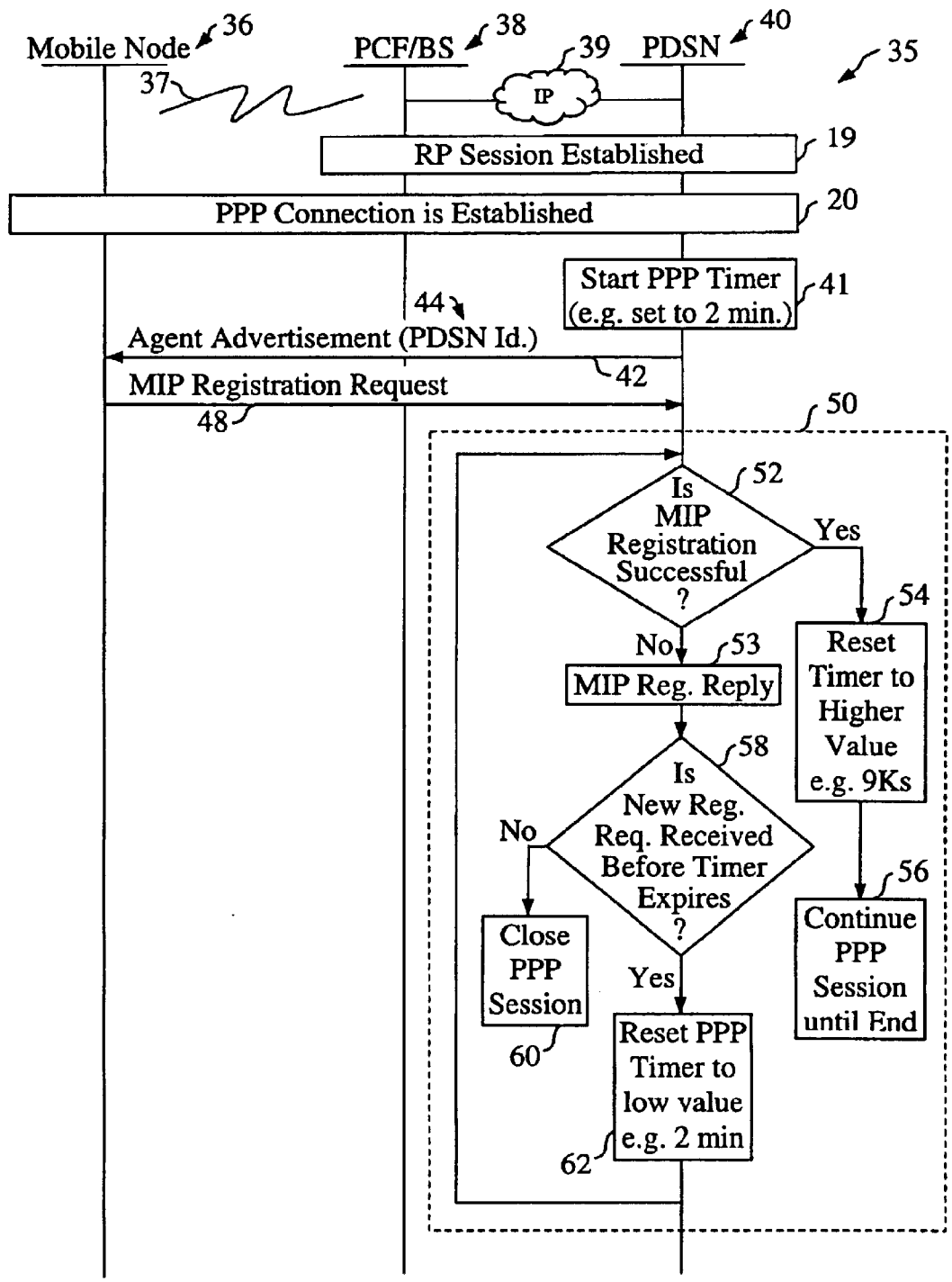
FIG. 2 is a nodal operation and signal flow diagram illustrating an exemplary preferred embodiment of the invention.

Reference is now made to FIG. 2 wherein there is shown a nodal operation and signal flow diagram illustrating an exemplary preferred embodiment of the invention that solves the above-mentioned deficiencies. In FIG. 2, there is shown an IP-based cellular telecommunications network 35, such as for example but not limited to a CDMA 2000 cellular telecommunications network. The network 35 comprises an MN 36, which is typically a wireless terminal connected through a radio (air) interface 37 to a Packet Control Function (PCF) of a Base Station Controller (BSC), PCF/BSC, 38. The PCF/BSC 38 is further connected typically through an IP-based wireline link 39 to a PDSN 40, which may perform at least part of the switching and addressing functions of the network 35.

The method may start with step 20 wherein a Point-to-Point Protocol (PPP) connection is established between the MN 36 through the PCF/BSC 38 to the PDSN 40. In the network 35, the establishment of the PPP connection of step 20 may be mandatory for allowing a communication to take place between the MN 36 and the PDSN 40. Responsive to the establishment of the PPP connection, the PDSN 40 starts a PPP timer set to expire after a substantially short predetermined period of time, such as for example after two minutes, step 41. According to the preferred embodiment of the present invention, the substantially short predetermined period of time may be comprised in the range of one second to 10 minutes, and preferably in the range of one minute to five minutes. The PDSN 40 then sends to the MN 36 an Agent Advertisement message 42 that may comprise the PDSN identification 44. Responsive to the receipt of the Agent Advertisement message 42, the MN 36 sends an MIP registration request 48 for registering with the PDSN 40.

The purpose of the registration may be for example to communicate the current MN <<reachability>> information to a Home Agent (HA) in order to dynamically obtain an IP address. According to the preferred embodiment of the present invention, upon receipt of the MIP registration request 48, the PDSN 40 attempts to perform the necessary functions for registering the MN 36. At step 52, the PDSN 40 detects if the MIP registration is successful. If yes, i.e. the MIP registration is successful, the PDSN 40 resets the timer started in step 41 to a substantially higher value than the short predetermined period of time, such as for example to the default value of at least 9000 seconds. The purpose of this modification of the PPP timer is to allow the higher-level application timers existing within the PDSN to be initiated as the underlying MIP connection has been successfully established. The communication is then established and the PPP connection set-up in step 20 continues until one party involved in the communication terminates it. On the other hand, if the MIP registration is detected to be unsuccessful in step 52, an MIP registration reply is sent back to the MN 36 through the PCF/BS 38 for informing the MN of the MIP registration failure; at the same time, the PPP connection established in step 20 is maintained alive for the substantially short predetermined period of time (i.e. until the PPP timer expiration) for allowing the MN 36 to re-attempt an MIP registration, regardless of the type of error, or error code, that caused the MIP registration to be unsuccessful. Thus, following step 52, the PPP connection, and implicitly the RP connection, is kept alive for the duration of the substantially short period of time. In step 58, it is further detected if an additional MIP registration request (not shown) is, or is not, received before the PPP timer expiration. If the PPP timer expires and no MIP registration request is received by the PDSN 40, then the PDSN terminates the PPP connection. Otherwise, if a new MIP registration request 48' (not shown in FIG. 2) is received by the PDSN 40 before the expiration of the PPP timer, as detected in step 58 with positive result, then the method returns to step 52 for detecting if the new MIP registration attempted on the basis of the new MIP registration request 48' is successful or not, as described hereinbefore. However, before returning to step 52, the method resets the PPP timer to the original substantially low predetermined period of time, so that if further in step 52, an unsuccessful MIP registration is again detected, the MN 36 is given the same original substantially low predetermined period of time for re-attempting yet another additional MIP registration request.

With the above described preferred embodiment of invention, upon each unsuccessful MIP registration attempt of the MN 36, the PDSN 40 waits for the predefined period of time before killing the existing PPP connection, thus allowing MN 36 to re-attempt another MIP registration during that predefined period of time.

Figure 3:
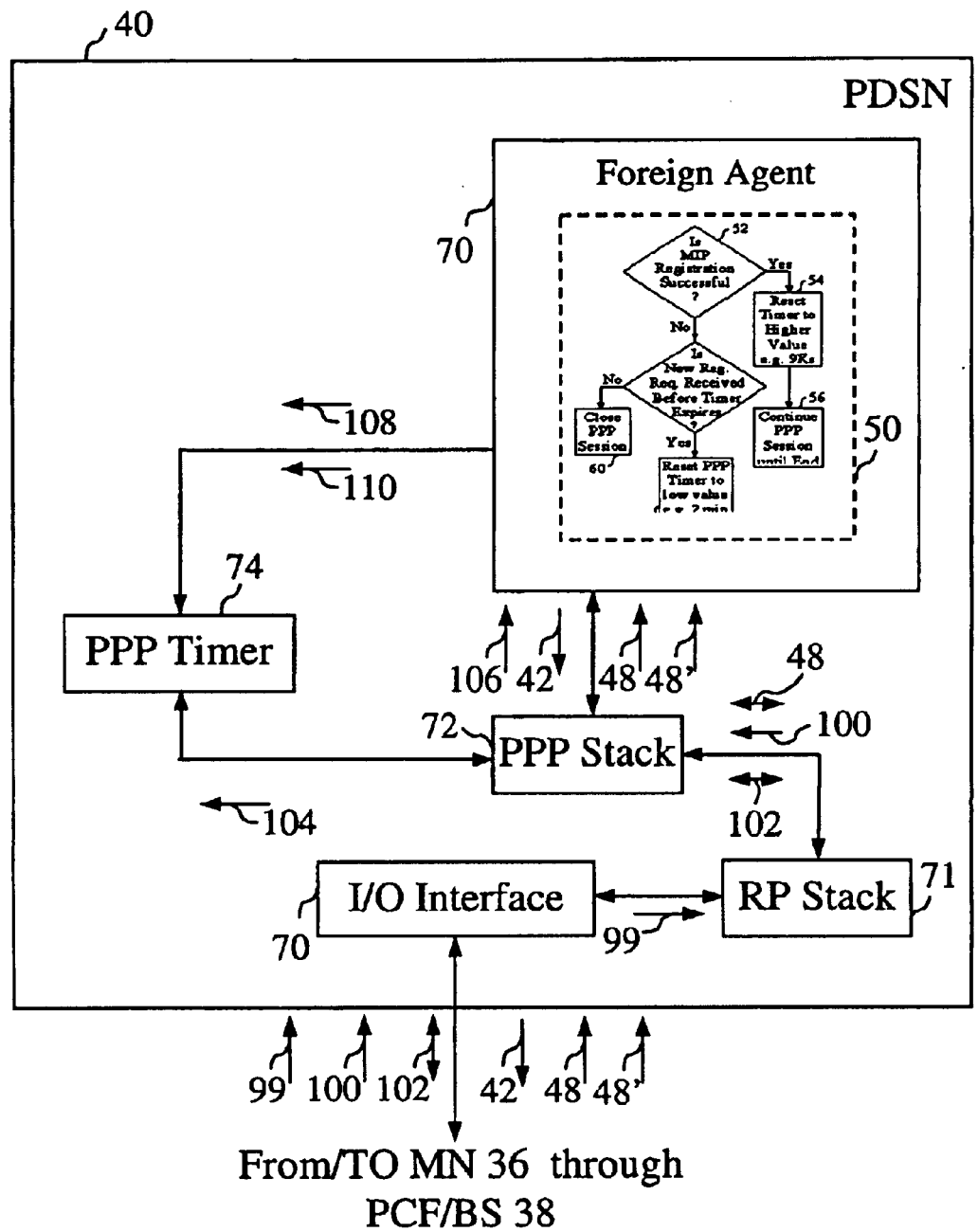
FIG. 3 is a high level block diagram of an exemplary implementation of the preferred embodiment of the invention within a Packet Data Serving Node (PDSN).

Reference is now made to FIG. 3, wherein there is shown a high level block diagram of an exemplary implementation of a preferred embodiment of the invention within Packet Data Serving Node (PDSN) 40. Shown in FIG. 3 is a PDSN 40 that may comprise an I/O Interface 70 for allowing the PDSN 40 to communicate with the MN 36 through the PCF/BSC 38. The PDSN 40 may also comprise an RP stack 71 connected to the I/O interface 70, used for supporting the RP connection with the PCF/BSC 38. The PDSN 40 may further comprise a PPP stack 72 connected to the RP stack 71, for supporting the establishment of the PPP connection between the MN 36 and the PDSN 40 such as the one established in step 20 of FIG. 2. The PPP stack 72 may be further connected to a PPP timer 74. The RP stack 71, the PPP stack 72 and the PPP timer 74 may be connected to a PDSN/Foreign agent functionality 70 which may be responsible for the processing necessary for establishing the RP and PPP connections and for registering the MN 36. According to a preferred embodiment of the present invention, an A-11 message 99 for requesting the establishment of an RP session is sent from the PCF/BSC 38 to the PDSN 40. Upon receipt of message 99, the I/O interface 70 relays the A-11 message 99 to the RP stack 71, which in turn activates the RP session with the PCF/BSC 38. Further, a registration request message 100 may be first sent from the MN 36 to the PDSN 40 for requesting the establishment of a PPP connection between the MN 36 and the PDSN 40. The message 100 is received by the I/O interface 70, relayed to the RP stack 71 and then relayed to the PPP stack 72. Various PPP session configuration messages 102 may be exchanged between the PDSN/Foreign agent 70 and the PPP stack 72 on one side, and the MN 36 on the other side, until the PPP connection is established, step 20 of FIG. 2, which results in the activation of the PPP stack 72. This step may be performed as it is known in the art, such as for example according to the standard Request for Comments (RFC) 1661—Point-to-Point Protocol (PPP), herein enclosed by reference. Following the establishment of the PPP connection, a PPP timer start request 104 may be sent from the PPP stack 72 to the PPP timer 74 for starting the PPP timer, the timer being instructed to expire after a substantially low predefined period of time, as described hereinbefore. The PPP stack 72 may then inform the PDSN/Foreign agent 70 through message 106 that the PPP connection is established. Responsive to message 106, the PDSN/Foreign agent 70 sends an agent advertisement message 42, as mentioned with reference to FIG. 2, to the MN 36, via the PPP stack 72, the RP stack 71, and the I/O interface 70. Responsive to the receipt of the agent advertisement message 42, the MN 36 returns to the PDSN 40 an MIP registration request 48, which is relayed by the I/O interface 70 to the PDSN/Foreign agent 70, transparently through the RP stack 71 and the PPP stack 72. Upon receipt of the MIP registration request 48, the PDSN/Foreign agent 70 may perform the method corresponding to block 50 shown in FIG. 2. With joint reference being now made to both FIG. 2 and FIG. 3, the PDSN/Foreign agent 70 first attempts to perform the necessary actions for registering the MN 36. At step 52, the foreign agent 70 detects if the MIP registration is successful. If yes, i.e. if the MIP registration is successful, the PDSN/Foreign agent 70 resets the PPP timer started in step 41 to a substantially higher value than the short predetermined period of time, such as for example to the default value of more than 9000 seconds, by sending a reset timer message 108 to the PPP timer 74. The purpose of this modification of the PPP timer is to allow the higher-level application timers to be initiated as the underlying MIP connection is successfully established. The communication is then established and the PPP connection set up in step 20 continues until one party involved in the communication terminates it. On the other hand, if the MIP registration is detected to be unsuccessful in step 52, the PPP connection established in step 20 is maintained alive for the substantially short predetermined period of time, until the expiration of the PPP timer 74, for allowing the MN 36 to re-attempt an MIP registration. In step 58 it is detected if an MIP registration request is, or is not received, before the PPP timer expiration. If the PPP timer expires and no other MIP registration request is received by the foreign agent 70 from the MN 36, then the PDSN/Foreign agent terminates the PPP and RP connections by disabling the PPP stack 72 and the RP stack 71 respectively. Otherwise, if a new MIP registration request 48' (shown in FIG. 3) is received by the PDSN/Foreign agent 70, as detected in step 58 with positive result, then the method returns to step 52 for detecting if the new MIP registration attempted on the basis of the new MIP registration request 48' is successful or not, as described hereinbefore. However, before attempting the registration, the method resets the PPP timer 74 to the original substantially low predetermined period of time, by sending another reset timer message 110, so that if further in step 52, an unsuccessful MIP registration is again detected, the same original substantially low predetermined period of time is provided to the MN 36, allowing for yet another attempt of MIP registration.

The functionalities of the PDSN 40 illustrated in FIG. 3, including the foreign agent 70, the PPP timer 74, the RP stack 71, the PPP stack 72 and the I/O interface 70 may be software modules or applications, hardware modules such as for example computers and/or programmable chips, or any combination thereof, such as for example software functionalities running on top of an operating system, itself running on the hardware computer platform.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telecommunications network, a method for Mobile Internet Protocol (MIP) registration between a Mobile Node (MN) and a Packet Data Serving Node (PDSN), the method comprising the steps of:
   establishing a Point-to-Point Protocol (PPP) connection between the MN and the PDSN;
   responsive to the establishment of the PPP connection, starting a PPP timer set to expire after a predetermined period of time;
   attempting an MIP registration of the MN with the PDSN;
   detecting if the MIP registration is successful;
   upon detecting an unsuccessful MIP registration of the MN with the PDSN, keeping alive the PPP connection between the MN and the PDSN until an expiration of the predetermined period of time of the PPP timer;
   detecting if a new MIP registration request is received by the PDSN from the MN before the expiration of the predetermined period of time; and
   if a new MIP registration request is received by the PDSN from the MN before the expiration of the predetermined period of time, resetting the PPP timer to the predetermined period of time.

2. The method claimed in claim 1, wherein the step of attempting an MIP registration, i) is performed responsive to a receipt at the MN of an agent advertisement message received from the PDSN, and ii) comprises sending from the MN to the PDSN an MIP registration request.

3. The method claimed in claim 1, wherein the predetermined period of time is comprised in a range of one second to ten minutes.

4. The method claimed in claim 3, wherein the predetermined period of time is comprised in a range of one minute to 5 minutes.

5. The method claimed in claim 1, further comprising the step of:
   terminating the PPP connection if a new MIP registration request is not received by the PDSN from the MN before the expiration of the predetermined period of time.

6. An Internet Protocol-based (IP-based) cellular telecommunications system comprising:
   a Mobile Node (MN); and
   a Packet Data Serving Node (PDSN) connected to the MN through a Point-to-Point Protocol (PPP) connection;
   wherein responsive to an establishment of the PPP connection, the PDSN starts a PPP timer set to expire after a predetermined period of time, detects if an Mobile Internet Protocol (MIP) registration is successful and wherein upon detecting an unsuccessful MIP registration attempt of the MN with the PDSN, the PDSN keeps alive the PPP connection between the MN and the PDSN until an expiration of the predetermined period of time of the PPP timer, further detects if a new MIP registration request is received from the MN before the expiration of the predetermined period of time, and if a new MIP registration request is received from the MN before the expiration of the predetermined period of time, resets the PPP timer to the predefined period of time.

7. The system claimed in claim 6, wherein the IP-based cellular telecommunications system is a Code Division Multiple Access (CDMA) 2000 cellular telecommunications system.

8. The system claimed in claim 6, wherein:
   the PDSN sends an agent advertisement message to the MN;
   responsive to a receipt at the MN of the agent advertisement message sent by the PDSN, the MN sends an MIP registration request message for attempting to register with the PDSN.

9. The system claimed in claim 6, wherein the predetermined period of time is comprised in the range of one second to ten minutes.

10. The system claimed in claim 6, wherein the predetermined period of time is comprised in the range of one minute to 5 minutes.

11. The system claimed in claim 6, wherein the PDSN terminates the PPP connection if a new MIP registration request is not received from the MN before the expiration of the predetermined period of time.

12. A Packet Data Serving Node (PDSN) comprising:
   a Point-to-Point Protocol connection (PPP) timer started upon establishment of a PPP connection between the PDSN and a Mobile Node (MN), the PPP timer being set to expire after a predetermined period of time;
   a PPP stack enabled upon the establishment of the PPP connection;
   a PDSN/Foreign agent functionality for performing a Mobile Internet Protocol (MIP) registration of the MN with the PDSN and for detecting if the MIP registration is successful; and
   wherein upon detecting an unsuccessful MIP registration attempt of the MN with the PDSN, the PDSN/Foreign agent keeps the PPP stack enabled and the PPP connection alive between the MN and the PDSN until an expiration of the predetermined period of time of the PPP timer, detects if a new MIP registration request is received from the MN before the expiration of the Predetermined period of time: and if a new MIP registration request is received from the MN before the expiration of the predetermined period of time, resets the PPP timer to the predefined period of time.

13. The PDSN claimed in claim 12, wherein at least one of the PPP timer, the PPP stack, and the PDSN/Foreign agent are software modules.

14. The PDSN claimed in claim 12, wherein at least one of the PPP timer, the PPP stack, and the PDSN/Foreign agent are hardware modules.

15. The PDSN claimed in claim 12, wherein at least one of the PPP timer, the PPP stack, and the PDSN/Foreign agent are software modules running on an operating system itself running on top of a hardware platform.

16. The PDSN claimed in claim 12, wherein the PDSN operates in a Code Division Multiple Access (CDMA) 2000 cellular telecommunications system.

17. The PDSN claimed in claim 12, wherein:
the PDSN/Foreign agent sends an agent advertisement message to the MN upon establishment of the PPP connection between the PDSN and the MN; and
responsive to a receipt at the MN of the agent advertisement message, the MN sends an MIP registration request message for attempting to register with the PDSN/Foreign agent.

18. The PDSN claimed in claim 12, wherein the predetermined period of time is comprised in the range of one second to ten minutes.

19. The PDSN claimed in claim 12, wherein the predetermined period of time is comprised in the range of one minute to 5 minutes.

20. The PDSN claimed in claim 12, wherein the PDSN/Foreign agent terminates the PPP connection if a new MIP registration request is not received from the MN before the expiration of the predetermined period of time.

21. In a cellular telecommunications network, a method for Mobile Internet Protocol (MIP) registration between a Mobile Node (MN) and a Packet Data Serving Node (PDSN), the method comprising the steps of:
establishing a Point-to-Point Protocol (PPP) connection between the MN and the PDSN;
responsive to the establishment of the PPP connection, starting a PPP timer set to expire after a predetermined period of time;
attempting an MIP registration of the MN with the PDSN;
detecting if the MIP registration is successful; and
upon detecting an unsuccessful MIP registration of the MN with the PDSN:
sending from the PDSN to the MN an MIP registration reply for informing the MN that the MIP registration was unsuccessful;
keeping alive the PPP connection between the MN and the PDSN until an expiration of the predetermined period of time of the PPP timer; and
responsive to a receipt of the MIP registration reply at the MN, attempting an additional MIP registration of the MN with the PDSN by sending an additional MIP registration request from the MN to the PDSN, detecting if the additional MIP registration request is received by the PDSN from the MN before the expiration of the redetermined period of time and if the additional MIP registration request is received by the PDSN from the MN before the expiration of the predetermined period of time, resetting the PPP timer to the predetermined period of time wherein the steps of attempting an MIP registration and the step of attempting an additional MIP registration comprise sending from the MN to the PDSN an MIP registration request.

22. The method claimed in claim 21, wherein the predetermined period of time is comprised in a range of one second to ten minutes.

23. The method claimed in claim 22, wherein the predetermined period of time is comprised in a range of one minute to 5 minutes.

24. The method claimed in claim 21, further comprising the step of:
terminating the PPP connection if the additional MIP registration request is not received by the PDSN from the MN before the expiration of the predetermined period of time.

* * * * *